March 13, 1951  R. B. MUCHMORE  2,544,715
WAVE GUIDE MODULATING AND SWITCHING APPARATUS
Filed Aug. 30, 1945  2 Sheets-Sheet 1
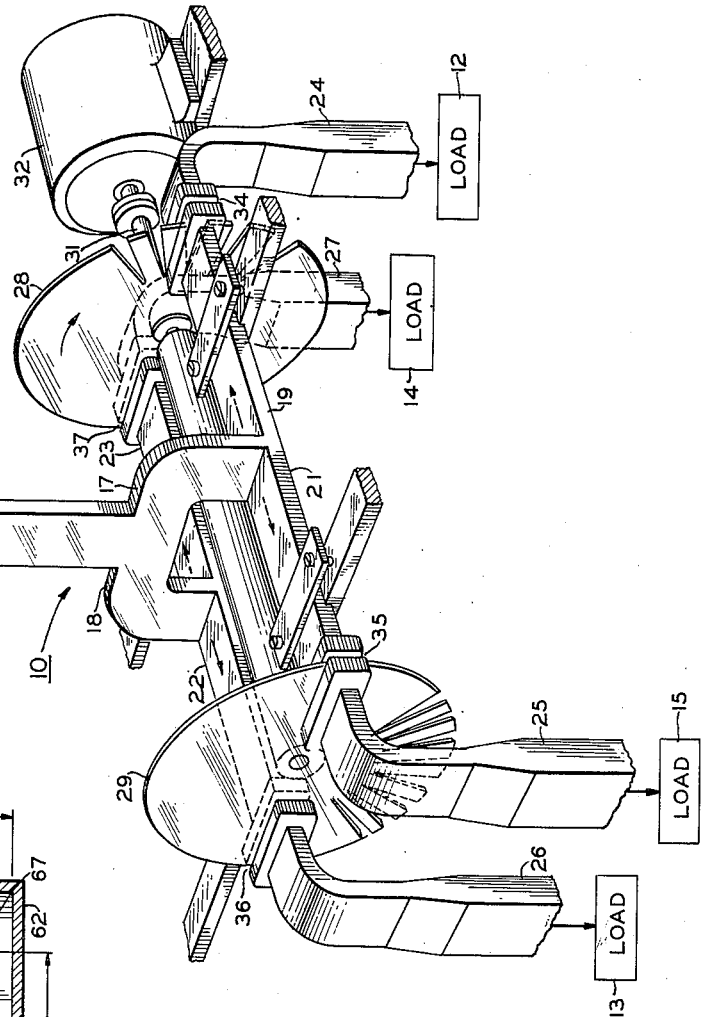
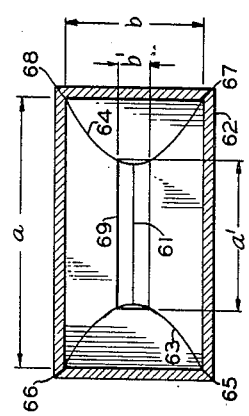
INVENTOR
ROBERT B. MUCHMORE March 13, 1951  R. B. MUCHMORE  2,544,715
WAVE GUIDE MODULATING AND SWITCHING APPARATUS
Filed Aug. 30, 1945  2 Sheets-Sheet 2
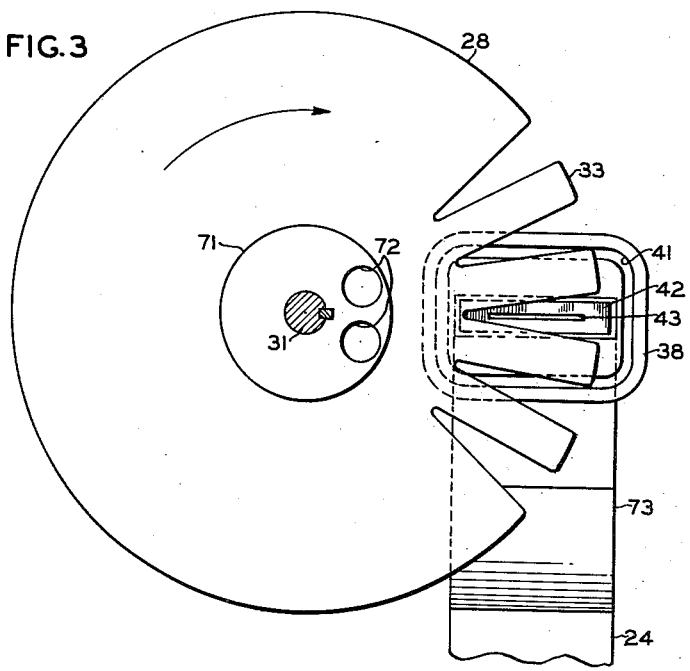
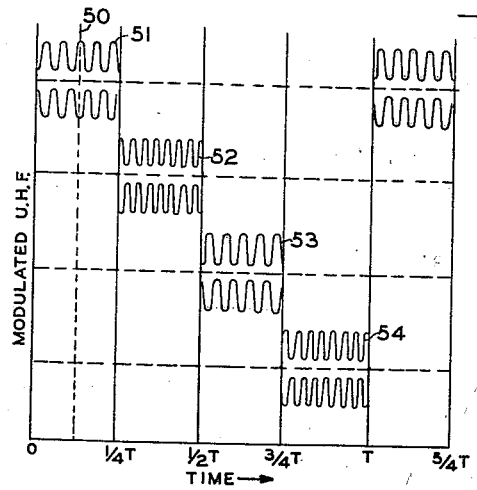
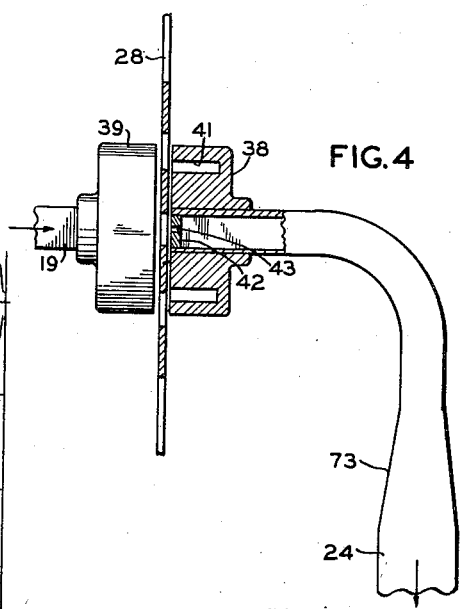
INVENTOR
ROBERT B. MUCHMORE
BY
ATTORNEY Patented Mar. 13, 1951

2,544,715

UNITED STATES PATENT OFFICE 2,544,715

WAVE GUIDE MODULATING AND SWITCHING APPARATUS

Robert B. Muchmore, Hempstead, N. Y., assignor to The Sperry Corporation, a corporation of Delaware Application August 30, 1945, Serial No. 613,639

4 Claims. (Cl. 178—44)

This invention relates generally to amplitude modulation or interruption of ultra high frequency radio waves and has reference more particularly to electromechanical wave guide modulators or switches.

Wave guide modulators have been disclosed that are adapted to interpose a wave interceptor or reflector between juxtaposed sections of a wave guide conduit coupling a source of ultra high frequency energy to a utilization circuit for the purpose of varying the energy flow. The flow may be switched on or off or may be modulated to any desired extent. This switching or modulation is achieved by varying the amount or position of that portion of the reflector interposed between the conduit sections. This variation is usually accomplished by providing relative rotation between the conduit sections and the wave interceptor or reflector.

One of the most satisfactory wave interceptors is a simple conducting surface reflector provided with holes or windows in its surface or formed with an irregular periphery. At present the most common structure of this type employs hollow rectangular conducting wave guides whose spaced ends, forming the gap into which the reflector is interposed, are furnished with means for inhibiting radiation lost therefrom. This radiation inhibiting means may conveniently take the form of a well known choke joint or wave trap such as the one described in Practical Analysis of Ultra High Frequency, by Meagher and Markley, published by R. C. A. Service Company, Inc., 1943.

These mechanical wave guide modulators constitute a marked advance over prior devices for the same purpose in that they are mechanically rugged and not too sharply resonant and, therefore, require no critical tuning adjustments sensitive to frequency changes, but, prior to the present invention, these devices have been unduly bulky and have required a disproportionate amount of mechanical power to actuate them.

The principal object, therefore, of the present invention is to provide a simplified and improved mechanical wave guide modulator and/or switch.

A further object of the invention is to provide improved apparatus and instrumentalities embodying novel features and principles, adapted for use in realizing the above object and also adapted for use in other fields.

The invention in another of its aspects relates to novel features of the instrumentalities described herein for achieving the principal object of the invention and to novel principles employed in those instrumentalities, whether or not these features and principles are used for the said principal object or in the said field.

Another feature is the formation of a constriction at the end of a wave guide associated with a movable wave interceptor or shutter for reducing the effective cross section of the guide and, therefore, the area of the interceptor or shutter necessary for substantially blocking the guided waves.

A further feature is the positioning of a diaphragm in a wave guide substantially flush with the end of the guide, the diaphragm containing a slit cut therein resonant to the frequency of the energy flowing through the guide to form a secondary source of energy having minimum dimensions. Other features and advantages will become apparent as the description proceeds and after consideration of the embodiment illustrated in the drawings, wherein Fig. 1 is an oblique view of a particular form of electromechanical wave guide modulator and switch embodying the present invention;

Fig. 2 is a diagram illustrating the design of a wave guide diaphragm having a resonant slit formed therein;

Fig. 3 is a detailed view of a reflector disc employed in the apparatus shown in Fig. 1;

Fig. 4 is a transverse view in partial cross section of the disc and apertured diaphragm shown in Fig. 3; and Fig. 5 is a graph illustrating the amplitude envelope of the waves supplied to the load circuits by the generator shown in Fig. 1.

Similar reference numerals are employed to indicate corresponding parts in the above figures.

Generally speaking, the present invention contemplates an amplitude modulator or switch structure for ultra high frequency radio oscillations utilizing two hollow conducting wave guides having ends disposed opposite and adjacent each other for radiating and receiving the oscillations. An abrupt constriction is provided at the end of at least one of these guides for reducing its effective cross section, and a filter is usually associated with the guide ends for inhibiting radiation transversely thereof. A wave interceptor or shutter is caused to pass between these wave guide ends to modulate or block, according to the character and relative motion of the wave interceptor, the oscillations attempting to flow between the guides. The constriction may take the form of an apertured diaphragm, for example, a metallic wall containing a rectangular slit, placed substantially flush with the wave guide end. This aperture or slit is designed to be resonant at the operating frequency of the wave guide and may be made very narrow in comparison to the transverse dimensions of the guide.

The wave interceptor may conveniently be a reflecting surface having a generally disc-like configuration adapted to be rotated in the gap between the guides to provide the desired relative motion. The size of this reflecting surface may be very substantially reduced in contrast to prior structure since, in many practical applications, the wave blocking area need extend only a little beyond the wave guide constriction to obtain satisfactory modulation of the energy flow. Likewise, only slight relative transverse motion is required between the wave intercepting area and the wave guide constriction in order to alter radically the energy flow. This is a particularly attractive feature when square wave switching is desired.

Referring now to Fig. 1, there is shown an ultra high frequency energy distribution system embodying the present invention that has special utility in aircraft instrument landing transmitting apparatus. In the particular structure chosen for illustration, wave guide switching and modulating apparatus 10 is interposed between a generator 11 and load circuits 12, 13, 14 and 15. The apparatus 10 is adapted both to modulate alternately at one of two audio frequencies and distribute the energy from generator 11 to loads 12, 13, 14 and 15 in succession. The mode of transmission employed is the lowest transverse electric or $TE_{1,0}$ mode. A rectangular wave guide 16 coupled to the generator 11 makes a shunt T connection with wave guides 17 and 18, which latter are circularly bent through right angles and then joined by series T junctions with wave guides 19, 21 and 22, 23, respectively.

A T joint comprises a straight section of wave guide from which there branches at right angles another section of wave guide. A series T is considered that type of junction wherein the perpendicular section extends from the larger dimension of the guide, while a shunt T junction has the right angle section attached to the narrower side of the guide.

Wave guide sections 21 and 22 are positioned side by side as are guide sections 19 and 23. The ends of wave guides 19 and 23 are placed opposite and adjacent but physically separated from the ends of guides 24 and 27, respectively, the latter being connected to load circuits 12 and 14, respectively. Two air-gaps 34 and 37 are thus formed of sufficient width to permit a metallic disc 28 mounted on a shaft 31 driven by a motor 32 to be rotatably interposed therein. In a similar manner wave guides 21 and 22 are coupled by air-gaps 35 and 36 to wave guides 25 and 26, respectively, feeding load circuits 15 and 13, respectively. A disc 29, generally similar to disc 28, is also attached to the shaft 31 and is adapted to revolve between gaps 35 and 36.

Disc 28, shown in detail in Fig. 3, has portions of its periphery cut away in order that the gap 34 be alternately obstructed and free when the motor 32 is in operation. The configuration of the disc 28, chosen by way of example, has four teeth 33 formed by five V-shaped notches evenly spaced over approximately a quarter of the disc's circumference. The action of the rotating disc 28 is to permit or impede the flow of energy from generator 11 to wave guide 24 and thus to the load 12 at a frequency determined by the speed of motor 32 and the shape and placement of the teeth 33. The disc 29, as shown in Fig. 1, contains seven teeth formed by eight V-shaped cuts equally spaced over a quarter of the disc's circumference. Disc 29 is angularly positioned on shaft 31 relative to disc 28 so that the notched portion of the former cooperates with gaps 35 and 36 only during the alternate quarter periods in which the notched portion of disc 28 is clear of both gap 34 and gap 37.

Fig. 5 illustrates the modulation envelope and transmission sequence produced by discs 28 and 29. Modulation envelopes 51, 52, 53 and 54 correspond to the energy applied to load circuits 12, 13, 14 and 15, respectively. Envelope 51 shows that there are five substantially sinusoidal variations in the energy to load circuit 12 during a fourth of every disc rotation and a smiliarly modulated portion of energy is provided to load circuit 14 during every third quarter of the cycle. Modulation envelopes 52 and 54 indicate there are eight amplitude variations in the energy transmitted during each second and fourth quarter cycles to loads 13 and 15, respectively. Envelopes 52 and 54 overlap slightly with adjacent quarter revolutions of the discs. Such an arrangement of teeth produces alternately 600 and 900 cycle modulation during alternate quarter revolutions when the discs are rotated at 1800 R. P. M. It might appear necessary to modulate the energy supplied to loads 13 and 15 seven and one-half times during alternate quarter cycles, but, it being impossible to modulate sinusoidally in such manner, eight notches are employed in disc 29 causing portions of the 900 cycle modulation envelopes 52 and 54 to overlap slightly in time with 600 cycle envelopes 51 and 53. In instrument landing operation, this overlapping is inconsequential. If such overlapping is objectionable, seven notches occupying less than a quarter circumference may of course be employed to obtain a 900 cycle modulation or the modulation frequency may be appropriately altered. The instant in the modulation cycle illustrated by the position of discs 28 and 29 in Figs. 1 and 3 is represented in Fig. 5 by the dashed line 50.

In order to minimize the flow of energy out of the gap 34 between wave guide sections 19 and 24, and to permit maximum transmission between generator 11 and the load circuits 12—15, radiation inhibiting means are provided in the form of wave trap or choke couplings at the air-gaps 34—37. The choke coupling associated with gap 34, shown in detail in Figs. 3 and 4, is preferably of the so-called "choke-to-choke" symmetrical construction comprising a pair of annularly slotted members 38 and 39 placed on the ends of wave guides 24 and 19, respectively. Member 38 is formed with an annular slot 41 approximately a quarter of a wavelength deep at the operating frequency of the wave guide and a quarter wavelength distant from the wave guide opening. Member 39 is similarly fashioned and cooperates with member 38, offering high impedance to energy attempting to flow transversely of the wave guides and at the same time providing low attenuation for transmission therealong. These choke joints or wave trap couplings are well known in the art as mentioned above and greatly enhance the efficiency of the apparatus.

Prior to the present invention, modulating or switching discs employed with wave guides were cumbersome being often more than twice the diameter of those employed here for the same purpose. This was especially true where it was desired to modulate the energy flow at a relatively high audio frequency. Heretofore the teeth were required to be of dimensions sufficient to overlap the guide cross section and yet the spacing between adjacent teeth was necessarily equally generous in order not to disturb the free flow of energy. Since the required number of teeth increases with the desired modulation frequency, the speed of disc rotation remaining constant, severe windage, bulk and weight advantages were present when the desired audio frequencies were obtained.

These problems are overcome in the present apparatus by the employment of a transmitting diaphragm in the form of a metallic wall 42 positioned substantially flush with the end of wave guide 24. A rectangular slot 43 is symmetrically cut through the wall 42 perpendicular to the plane of polarization of the guided waves and aligned with a radius of the disc 28. The slot or window 43 may be considered as a reradiator or secondary source of energy having greatly reduced dimensions, as compared to the cross section of the wave guide. This permits a very considerable decrease in the size of the teeth necessary for substantially blocking the guided waves.

Transmitting diaphragms with rectangular window openings are known in the art and only in combination do they form a part of the present invention. It has been found that such openings when suitably proportioned relative to the transverse dimensions of the guide exhibit properties of a resonant transmitting screen or source of retransmission, analogous to a parallel resonant circuit shunted across a transmission line. It has been determined empirically that the approximate dimensions for resonance with the $TE_{1,0}$ mode of propagation are obtainable from the relation $$\frac{a}{b}\sqrt{1-\left(\frac{\lambda}{2a}\right)^2} = \frac{a'}{b'}\sqrt{1-\left(\frac{\lambda}{2a'}\right)^2}$$

where $a$ and $b$ are the guide dimensions and $a'$ and $b'$ are dimensions of the opening with $a'$ being measured parallel to $a$ and $b'$ parallel to $b$, and the free space wavelength is $\lambda$.

The results expressed in this equation are represented in Fig. 2 by the following geometrical construction. In the center of the cross section of the wave guide lay out a line 61 of length $$\frac{\lambda}{2}$$

parallel to the longest side 62 of the guide and centered with respect to the walls of the guide. Draw branches 63 and 64 of a hyperbola passing through opposite ends of line 61 and also through corners 65, 66 and 67, 68, respectively, of the wave guide. The approximate dimensions of a resonant rectangular opening are then any rectangle, such as opening 69, whose sides are parallel to the walls of the guide and whose corners lie on the hyperbola. The Q of the diaphragm is found to vary inversely with the slit width.

In the embodiment of the present invention, illustrated in Figs. 1, 3 and 4, 0.04 in. was chosen as the width of the slit 43 for manufacturing convenience and to maintain the Q of the device sufficiently low so as to virtually eliminate detuning with normal variations from the nominal operating wavelength of 5.795 cm. for which the structure was designed.

The discs 28 and 29 were cast from a light-weight alloy with only 7 in. extreme diameters and 2 in. diameter hubs 71. The thickness of the discs where they passed through the gaps was approximately a tenth of an inch, while the length of the teeth 31 was substantially an inch and a half. Holes 72 were drilled in the hub portion of the discs and filled with lead to compensate for the loss of weight from the cut-out portions. Discs 28 and 29 produced approximately 70% modulation of the ultra high frequency energy traversing the wave guides and prevented substantially all passage of energy during the quiescent portion of the modulation cycle.

It must be clearly understood that Figs. 1, 3 and 4 illustrate a particular form of electromechanical wave guide modulator which was chosen because it has been successfully reduced to practice but there are many variations in construction which may be resorted to even when effecting the same switching and modulating cycle illustrated in Fig. 5. For example, although the wall 42 containing the slot 43 was placed on the output side of the gap 34, it may be placed, if desired, on the generator side. It is not, however, usual to employ diaphragms on both sides of the gap because such an arrangement is more subject to misadjustment.

The output wave guides 24—27 are shown in Fig. 1 to have a tapered section which is illustrated more clearly in Figs. 3 and 4 by reducer section 73. This reduction is only in the dimension parallel to the plane of polarization of the waves traversing the guide 24. Such reduction in wave guide dimension lowers the characteristic impedance of the guide without altering the phase velocity of the waves transmitted by the guide. The use of these tapered sections is optional but serves to reduce the side of the choke coupling and permits a comparable decrease in the width of the teeth 33.

Many applications require distribution of energy between only two loads and utilize either modulated or switched energy but not both. Other uses necessitate distribution of energy between loads in pulses of the same frequency but different lengths. Such requirements are readily complied with by appropriate alteration of the configuration of the wave intercepting means, which in Fig. 1 comprises discs 28 and 29. A special advantage derived from the incorporation of transmitting diaphragms or resonant slits in the wave guides is the very abrupt change of energy flow between maximum and minimum with very slight movement of the wave intercepting means.

Inasmuch as the present invention has very general utility in the control of ultra high frequency energy and is in no way limited to specific modulation and switching sequences or rotatable disc reflectors, the discussion of the same by way of illustration is not intended to restrict the breadth of the invention whose scope is set forth in the appended claims.

What is claimed is:

1. A modulator for aircraft instrument landing systems and the like, including two pairs of output wave guides extending from respective loads to four corresponding feed points, each of said wave guides at its end adjacent the respective feed point including a resonant iris, two branch wave guides each extending from one of said feed points associated with one of said pairs of output guides to the corresponding feed points associated with the other pair of said output guides, the ends of said branch guides being spaced from the ends of said respective output guides to form gaps, and choke coupling means at said feed points to minimize radiation from said gaps transversely thereof, series T junctions at the longitudinal centers of said branch wave guides, a further wave guide connecting said junctions, a parallel T junction at the midpoint of said further guide, an input wave guide connected at one of its ends to said parallel T junction, a radio frequency source connected to the other end of said input wave guide, and movable shutter means interposed in said gaps at said feed points for covering and uncovering said irises to control the distribution of energy from said source to said loads.

2. The invention as set forth in claim 1, wherein said output wave guides include tapering portions providing at said gaps a reduced dimension in the plane of electrical polarization in the $TE_{1,0}$ mode of propagation.

3. The invention as set forth in claim 1, wherein said movable shutter means comprise rotatable discs provided with open sectors and extending into said gaps, and means for rotating said discs.

4. The invention as set forth in claim 3, wherein said discs are two in number, each of said discs extending into two of said gaps.

ROBERT B. MUCHMORE.

REFERENCES CITED

The following references are of record in the file of this patent:

UNITED STATES PATENTS

| Number | Name | Date |
| --- | --- | --- |
| 2,396,044 | Fox | Mar. 5, 1946 |
| 2,407,068 | Fiske | Sept. 3, 1946 |
| 2,415,242 | Hershberger | Feb. 4, 1947 |
| 2,423,130 | Tyrrell | June 1, 1947 |
| 2,423,508 | Leck | July 8, 1947 |
| 2,433,368 | Johnson | Dec. 30, 1947 |